(12) United States Patent
Lemaire et al.

(10) Patent No.: US 6,205,149 B1
(45) Date of Patent: *Mar. 20, 2001

(54) QUALITY OF SERVICE CONTROL MECHANISM AND APPARATUS

(75) Inventors: Thomas A. Lemaire, Acton; Paul J. Giacobbe, Townsend; John A. Flanders, Ashland; David Lipschutz, Lexington; Leonard Schwartz, Bedford; David C. Ready, Westwood; William D. Townsend, Groton, all of MA (US)

(73) Assignee: 3Com Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,650

(22) Filed: Sep. 11, 1997

(51) Int. Cl.[7] .................................................. H04L 12/28
(52) U.S. Cl. ........................................... 370/401; 370/400
(58) Field of Search .................................. 370/395, 400, 370/401, 412, 420, 421, 428, 429, 396, 397, 407, 410

(56) References Cited

U.S. PATENT DOCUMENTS

| | | | |
|---|---|---|---|
| 5,136,580 | * 8/1992 | Videlock | 370/403 |
| 5,353,283 | * 10/1994 | Tsuchiya | 370/230 |
| 5,461,611 | * 10/1995 | Drake, Jr. | 370/420 |
| 5,485,455 | * 1/1996 | Dobbins | 370/401 |
| 5,550,816 | * 8/1996 | Hardwick | 370/392 |
| 5,563,874 | * 10/1996 | Kant | 370/252 |
| 5,566,170 | * 10/1996 | Bakke | 370/392 |
| 5,598,410 | * 1/1997 | Stone | 370/469 |
| 5,625,622 | * 4/1997 | Johri | 370/232 |
| 5,666,353 | * 9/1997 | Klausmeier | 370/230 |
| 5,774,656 | * 6/1998 | Hattori | 395/200.53 |
| 5,920,705 | * 7/1999 | Lyon | 370/409 |
| 6,094,435 | * 7/2000 | Hoffman | 370/414 |

* cited by examiner

Primary Examiner—Douglas W. Olms
Assistant Examiner—Ricardo M. Pizarro
(74) Attorney, Agent, or Firm—Weingarten, Schurgin, Gagnebin & Hayes LLP (57) ABSTRACT

Quality of Service ("QoS") variables for predetermined protocol Type data units are stored in a cache memory. For data units that are associated with a flow, thirteen bytes selected out of the Internet Protocol ("IP") header are employed as at least a portion of a key to perform a cache lookup to obtain at least one Quality of Service variable from the cache. Both routing and QoS information may be stored in the cache for retrieval upon a single lookup operation.

24 Claims, 4 Drawing Sheets

FIG. 6
0 1 2 3
1 2 3 0
2 3 0 1
3 0 1 2 END

FIG. 7
0 1 2 3
1 0 2 3
0 1 2 3
2 0 1 3
0 1 2 3
1 0 2 3
0 1 2 3
3 0 1 2
0 1 2 3
1 0 2 3
0 1 2 3
2 0 1 3
0 1 2 3
1 0 2 3
0 1 2 3 END

QUALITY OF SERVICE CONTROL MECHANISM AND APPARATUS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is generally related to telecommunications networks, and more particularly to implementing Quality of Service ("QoS") processing control within such networks.

Devices such as bridges and routers are employed to move data units between end-stations in a telecommunications network. The data units may represent various types of traffic including voice, video and computer data. Because some traffic may be associated with real time communication, processing of certain data units may be particularly time critical. For example, processing delay or loss of data units associated with a real time voice or video transmission could significantly degrade the quality of such communication. However, delays in exchange of some types of computer data may not significantly affect the quality of such communication. It may also be desirable to prioritize traffic within a given type of communication.

One method for prioritizing data units in a telecommunications network is with QoS parameters. Each data unit within the telecommunications network includes a header portion and a data portion. The header portion includes information for handling the data unit such as Source Address and Destination Address information. The header may also include a QoS priority indicator. It is known to insert QoS information in the transport layer of the header. Devices which receive and retransmit data units within the telecommunications network then examine the QoS portion of the header of such data units and assign priority accordingly. However, QoS has not yet been implemented in an effective manner.

BRIEF SUMMARY OF THE INVENTION

In accordance with the present invention, Quality of Service ("QoS") variables for data units of at least one predetermined protocol Type are stored in a cache memory. For data units in a one way connection ("flow") with identified Source Address and Destination Address, thirteen bytes selected out of the Internet Protocol ("IP") header are employed as at least a portion of a key to perform a cache lookup to obtain at least one QoS variable. The QoS variable is employed to prioritize the data unit for processing.

Enhanced performance is provided for data units of a specified protocol type that are associated with a flow. Both routing and QoS information can be loaded into the cache. Such routing and QoS information can then be retrieved by executing a single cache lookup.

Token buckets may be employed to facilitate QoS implementation. A token bucket is associated with at least one flow. Tokens are then added to the token bucket at specified time intervals. A counter is employed to track token count, and the rate at which tokens are added indicates a rate limit for frames that can be scheduled through the token bucket. The token count indicates the number of bytes that can be sent through the bucket, thereby defining a transmission rate limit.

In order to further facilitate smooth operation the bridge/router can implement a Random Early Drop ("RED") procedure. Logic circuits generate a "congested ports" bitmask to indicate which output ports are deemed to be close to overflowing. For each output port which is indicated to be congested, the logic circuits configure a "RED shift value." The RED shift value is the length in bits of a bitmask that is ANDed with a random number to yield a result, N, that indicates a number of frames to be queued. The Nth frame is intentionally dropped. Hence, a relatively small number of packets are dropped such that end-stations recognize the situation and respond by transmitting at a lower rate, thereby relieving congestion and reducing the chance that output queues will overflow.

BRIEF DESCRIPTION OF THE DRAWING

The invention will be more fully understood in view of the following Detailed Description of the Invention, in conjunction with the Drawing, of which.

DETAILED DESCRIPTION OF THE INVENTION

Figure 1:
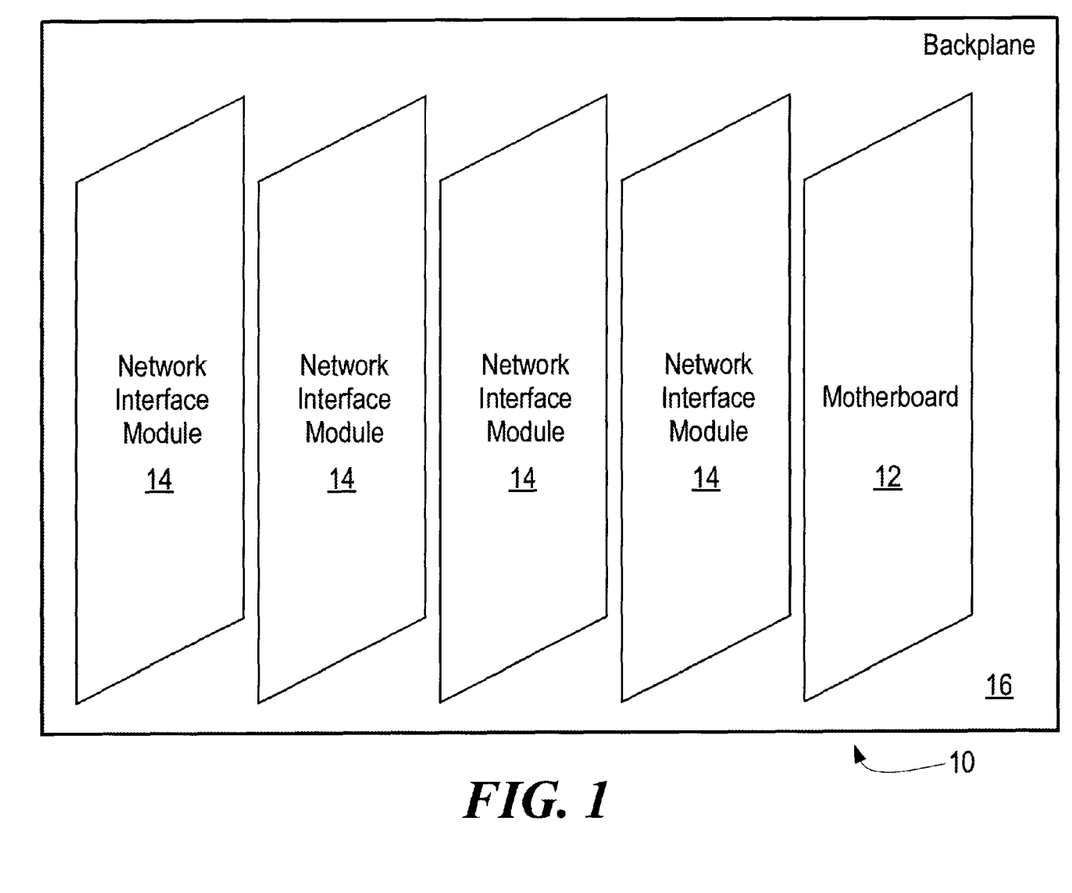
FIG. 1 is a simplified block diagram of a telecommunications bridge/router.
Figure 2:
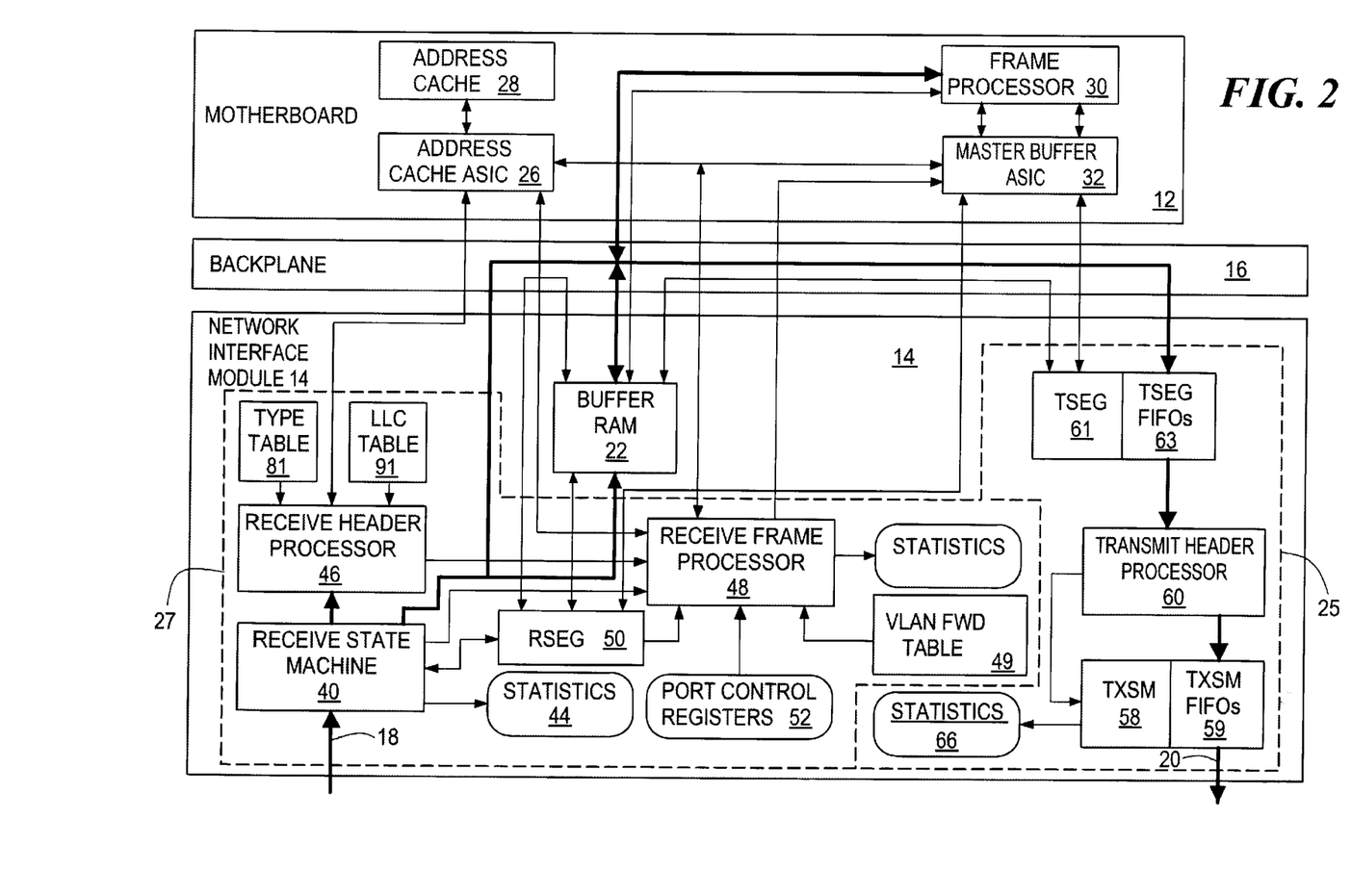
FIG. 2 is a block diagram which illustrates the motherboard and network interface modules of FIG. 1.

Referring to FIGS. 1 and 2, a bridge/router for use in a telecommunications network includes a motherboard 12 and at least one network interface module 14 which are interconnected through a backplane 16. Separate interface modules support Ethernet, Fiber Distributed Data Interface ("FDDI") and Asynchronous Transfer Mode ("ATM") traffic. In one embodiment each 10/100 Mb Ethernet interface module has six ports, each gigabit Ethernet interface module has one port, each FDDI interface module has six ports and each ATM interface module has two OC3 ports or one OC12 port. The ports provide connections to other devices in the network, through which data units can be received and transmitted. Incoming data units may be bridged, routed, translationally bridged and filtered by the bridge/router. Logic circuits in the motherboard and interface modules are responsible for data unit reception and transmission, parsing Data Link and Network Layer headers, looking up source and destination Media Access Control ("MAC") and Network Layer addresses and making forwarding decisions.

The motherboard 12 includes an Address Cache ASIC ("ACA") 26 with associated address cache memory 28, a Frame Processor ("FP") 30 and a Master Buffer ASIC ("MBA") 32. The Address Cache ASIC 26 is responsible for performing cache 28 lookups on Destination Addresses ("DAs") and Source Addresses ("SAs"). The Address Cache ASIC is employed to obtain MAC addresses for bridging support and Network Layer addresses for routing support. The Master Buffer ASIC 32 is responsible for data buffer management in buffer RAM 22.

Each network interface module includes buffer RAM 22, a Transmit ASIC ("TA") 25 and a Receive ASIC ("RA") 27. The Transmit ASIC and Receive ASIC are specific to the type of data traffic which the network interface device is designed to support (such as Ethernet, ATM and FDDI). The Receive ASIC 27 functions to perform a preliminary analysis on incoming data units. The Transmit ASIC 25 functions to transmit data units.

The Receive ASIC 27 includes a Receive State Machine ("RXSM") 40, a Receive Header Processor ("RHP") 46 and a Receive Frame Processor ("RFP") 48. The Receive State Machine is responsible for receiving data units through one or more ports from an associated communications link. After receiving a data unit, the Receive State Machine 40 generates data unit status information. The status information, which contains error information and byte and frame count data on a per port basis, is stored in registers 44. The Receive Header Processor 46 is responsible for identifying data units to be bridged or routed, determining inbound data unit encapsulation type, and performing protocol specific processing for routed data units. The Receive Header Processor also determines which VLAN, if any, each incoming frames is received on. There are different versions of Receive Header Processors 46 for different network interface types, e.g., Ethernet, FDDI and ATM. The Receive Header Processor 46 is primarily implemented in microcode. A Receive Segmentation DMA controller ("RSEG") 50 controls storage of received data units within appropriate buffer RAM 22 locations and forwards status information to the Receive Frame Processor 48. Information in a VLAN forwarding table 49 is employed by the Receive Frame Processor 48 to verify if the data unit is allowed to be forwarded through the outbound interface. In particular, the Receive Frame Processor 48 is responsible for making forwarding decisions based on information supplied by the Receive Header Processor 46, Address Cache ASIC 26, Receive State Machine 40, the RSEG 50 and VLAN configuration information contained in configuration tables associated with the Receive Frame Processor. The Receive Frame Processor 48 also generates Transmit Vectors for data units being processed in hardware over a fast processing path and Receive Vectors for data units being passed to the Frame Processor 30 software for further processing over a slower path. The Receive Frame Processor 48 is implemented partially in microcode.

The Transmit ASIC 25 includes a Transmit State Machine ("TXSM") 58, a plurality of Transmit State Machine FIFOs 59, and a Transmit Header Processor ("THP") 60. A Transmit Segmentation Controller ("TSEG") 61 serves to move data unit segments from locations within the Buffer RAM 22 into an input FIFO designated as the TSEG FIFO 63, which comprises an input FIFO to the Transmit Header Processor 60. The Transmit Header Processor 60 performs any necessary header translations and, upon completion of such translations, moves the translated header to the Transmit State Machine FIFO 59.

The Transmit Header Processor 60 also inserts VLAN tags into frames as necessary. Data units are forwarded from the Transmit State Machine FIFO 59 over the respective output port 20 of the network interface module 14. The Transmit State Machine 58 is responsible for controlling transmission of data units from the respective output port 20. Following transmission, the Transmit State Machine generates data unit transmit status information which is stored in registers 66. The status information includes error information and transmit byte and frame count information on a per port basis. Different versions of the Transmit State Machine 58 are provided for different network interface module types, e.g., Ethernet, FDDI and ATM.

Figure 3:
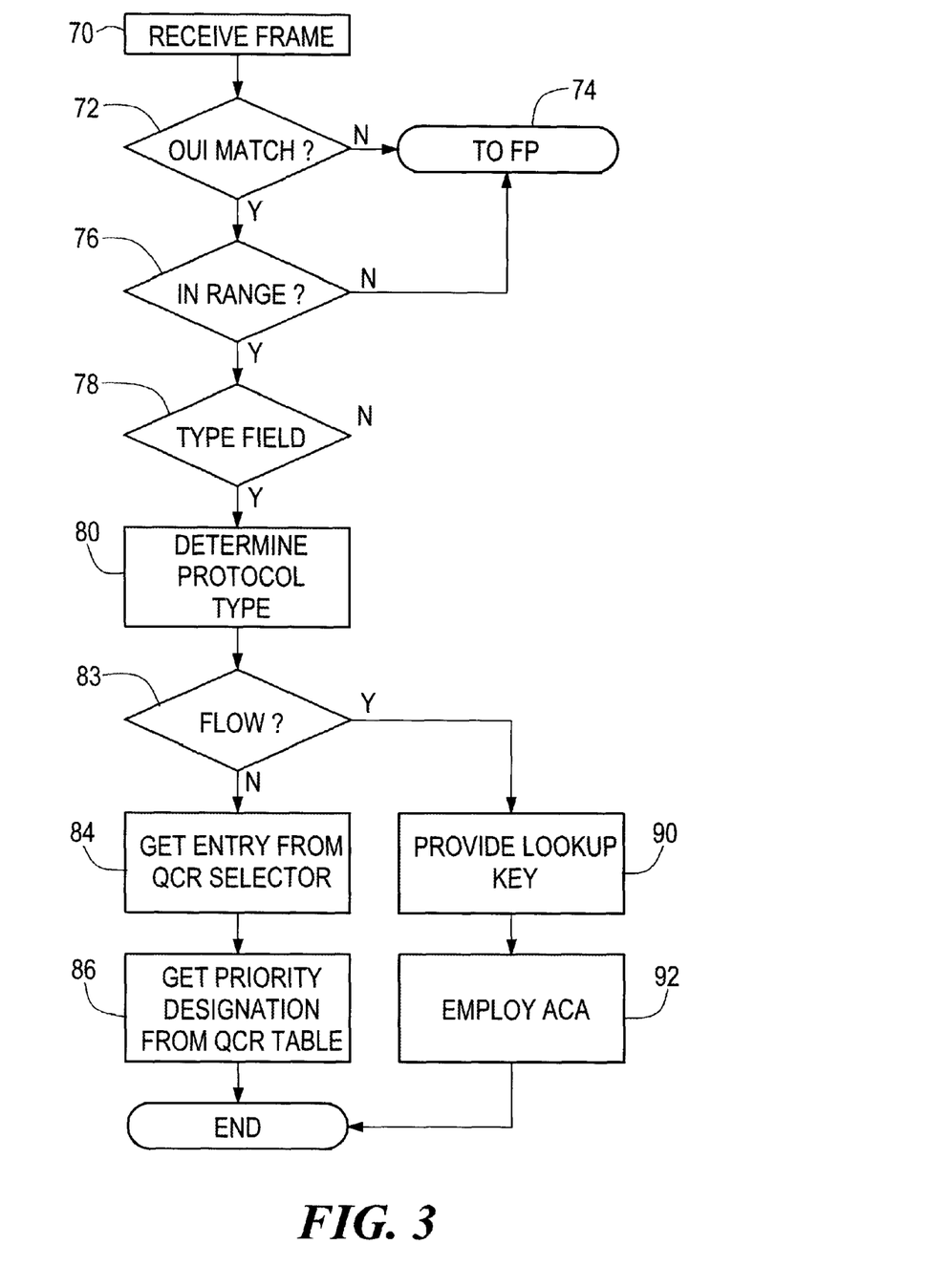
FIG. 3 is a flow diagram which illustrates implementation of QoS control.
Figure 4:
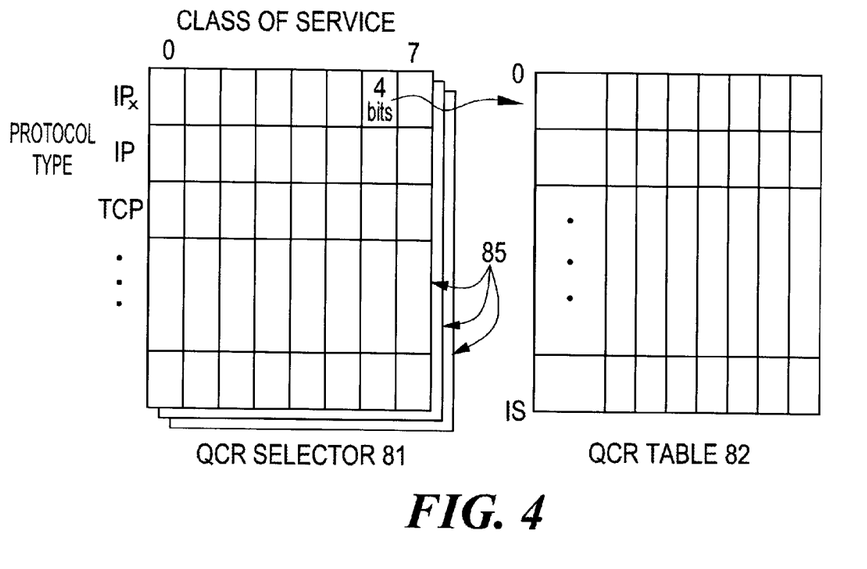
FIG. 4 illustrates memory tables employed by the bridge/router for QoS control.

FIGS. 3 and 4 illustrate data unit processing in conjunction with a network interface module configured for Ethernet type traffic. When an Ethernet frame enters the Receive Header Processor 46 as shown in step 70, the header portion of the frame is examined as shown in step 72. Given 20 a header with the format: Destination Address ("DA")/Source Address ("SA")/Type (e.g., IPv4, Appletalk etc.)/Internet Protocol ("IP") header, the Organization Unique Identifier ("OUI") is compared to the upper three bytes of the DA. If the OUI does not match the upper three bytes of the DA, then the frame is forwarded to the Frame Processor 30 for further processing by software as shown in step 74. If the OUI matches the upper three bytes of the DA, then the lower three bytes of the DA are examined to determine whether the value indicated by the lower three bytes of the DA falls within a predefined range as shown in step 76. The upper and lower bounds of the predefined range are maintained in first and second respective registers. The lower three bytes of the DA are compared with each of the first and second registers to determine whether the lower three bytes of the DA fall within the predefined range. If the lower three bytes of the DA do not fall within the range, then the frame is forwarded to the Frame Processor 30 for further processing by software as shown in step 74. If the lower three bytes of the DA fall within the predefined range, then the DA matches the address specified for the bridge/router and the location of the Type field is examined as shown in step 78. In particular, the value of the field following the SA field is compared with a predetermined value (1500) below which the field is assumed to be a Type field.

The specific protocol Type is determined as shown in step 80, where predefined values correspond to specific Types, e.g., 0800 corresponds to IPv4. The frame is then examined to determine if it is associated with a flow as shown in step 83. A flow is a one way connection of frames with positively identified Source Address and Destination Address. Step 83 may be implemented as follows:

```
bridgedPacket = (unicast && NOT this MAC DA);
if (packet not IP) {
    flow=FALSE;
} else if ((packet is broadcast) || (packet is an IP fragment))
    flow=FALSE;
} else if (bridgedPacket && (NOT Bridged-Flow-Enable)) {
    flow=FALSE
} else if ((COS-Means-Flow &&
            ((packet is PACE) || (packet is 802.1 CoS
                                             tagged))) ||
    (Bridged-Means-Flow && bridgedPacket) ||
    (Routed-Means-Flow && !bridgedPacket)) {
    flow=TRUE;
}else if (packet IP protocol is in IP Flow Filter table) {
    if ( (packet is UDP)  &&
         (packet is unicast) &&
         (UDP dest port !=1698)  &&
         (UDP dest port != 1699)  &&
         (   (UDP dest port < UDP port range1 low)  ||
             (UDP dest port > UDP port range1 high)) &&
         (   (UDP dest port < UDP port range2 low)  ||
             (UDP dest port > UDP port range2 high))
    }
        flow=FALSE;
    } else {
        flow=TRUE;
    }
} else {
    flow=FALSE;
}
```

If the frame is associated with a flow (flow=TRUE), a 13-byte IPv4 flow ID is employed an indicated in step 90. The 13-byte flow ID includes IP protocol Type, IP SA, IP DA, and UDP Source and Destination ports. The Address Cache ASIC 26 is then employed, and QoS variables are returned as shown in step 92. In particular, the Address Cache ASIC 26 returns a token bucket depth indicator, a transmit queue designator, a loss flag, an excess transmit queue designator, an excess loss flag, a designator for excess action to be taken on non-conforming frames, a retag enable indicator and a retag class designator. The excess transmit queue designator designates the transmit queue for non-conforming frames. If retag enable is set then the frame will be retagged and requeued rather than dropped in the event that bridge/router traffic prevents initial queueing and transmission. Since both routing and QoS information are stored in the address cache, frame forwarding can be commenced after a single lookup operation.

The Address Cache ASIC also returns a QoS enable bit. When set, the QoS enable bit indicates that the QoS information in the Cache is valid. When not set the QoS enable bit indicates that the frame is not actually associated with a flow, even though the result flow=TRUE was reached in step 83. When flow=TRUE and the QoS enable bit indicates that the frame is not actually associated with a flow, the frame is processed as a non-flow frame.

If the frame is not associated with a flow (flow=FALSE), the Receive Header Processor forwards the MAC DA, IP DST or IP SRC and DST, and lookup key length indicator to the ACA. The protocol Type and Class of Service ("CoS") are employed as indices into the QCR Selector 81 as shown in step 84 to obtain a 4-bit value. The 4-bit value is then employed as an index into the QoS Control Register ("QCR") Table 82 as shown in step 86. The QCR Table 82 provides a priority designation in one of eight priority levels.

Each entry in the QCR Table 82 includes eight fields totalling 32-bits. 20-bits are employed to designate token bucket depth. 2-bits are employed to designate which of the four queues associated with each port to transmit on. 1-bit is employed as a loss flag. The loss flag indicates the loss bit setting of the transmit vector. 2-bits are employed to designate the excess transmit queue, which designates the transmit queue for non-conforming frames. 1-bit is employed as an excess loss flag. 2-bits are employed to designate excess action to be taken on non-conforming frames. 1-bit is employed for retag enable, and 3-bits are employed to designate retag class. If retag enable is set then the frame will be retagged and requeued rather than dropped if bridge/router traffic prevents initial queueing and transmission.

There are sixteen class-based QCRs which the Receive Frame Processor employs to assign QoS variables on a per-traffic class basis. The QCRs may be assigned as follows:

| QCR 0  | IP Unicast (Best Effort, except TCP/IP)         |
|--------|-------------------------------------------------|
| QCR 1  | IP Multicast (non-RSVP flows)                   |
| QCR 2  | IP Broadcast                                    |
| QCR 3  | TCP/IP                                          |
| QCR 4  | IPX Unicast                                     |
| QCR 5  | IPX Multicast and Broadcast                     |
| QCR 6  | Appletalk Unicast                               |
| QCR 7  | Appletalk Broadcast and Unicast                 |
| QCR 8  | 802.1p Class 0                                  |
| QCR 9  | 802.1p Classes 2–4                              |
| QCR 10 | 802.1p Classes 5–7                              |
| QCR 11 | Unused                                          |
| QCR 12 | Unused                                          |
| QCR 13 | Unused                                          |
| QCR 14 | Unused                                          |
| QCR 15 | Default Class - all frames not otherwise classified |

The QCR selector 81 has separate sections 85 for unicast, multicast and broadcast traffic. Within each section, the Receive Header Processor protocol number is employed as an index to obtain a word. TCP/IP is handled as a separate protocol to allow UDP and TCP frames to be given different QoS control. The 802.1p traffic class is used to select the correct nibble within the word. The QCR selector may be implemented as:

```
nibble qcrSelectorTable [192];
if(packet is TCP/IP){    //this passed from RHP to RFP
    protocolIndex = 6;
} else if (rhpProtocolIndex > 5) {
    protocolIndex = 7;
} else {   //rhpProtocolIndex is between 0 and 5 inclusive
    protocolIndex = rhpProtocolIndex;
}    //protocolIndex now ranges from 0 to 7 inclusive
if (packet is unicast) {
    qcrIndex = 0;
}
if (packet is broadcast) {
    qcrIndex = 64;
}
if (packet is multicast) {
    qcrIndex = 128;
}
qcrIndex+=protocolIndex<<3;
//if packet was PACE or 802.1q CoS tagged -
//take three bits of CoS from RHP
qcrIndex+=RHP.CoS;
qcr = qcrTable[qcrIndex];
```

Token buckets are employed in SRAM to implement QoS parameters with traffic control algorithms. The token bucket algorithm is implemented in a packet scheduler. Each token bucket is initially empty at a time zero. Tokens are added to a token counter at specified intervals of time to indicate a rate limit for frames that can be scheduled through the token bucket. The token count reflects a credit for how many bytes can be sent through the bucket without violating a specified rate limit. The bucket has a maximum depth which reflects buffering available for the bucket and also governs the first level of traffic scheduled through the bucket. The token count never exceeds the bucket depth.

There are 128 token buckets and each token bucket is specified by a 20-bit token counter and a 12-bit token bucket rate (128*32=4 Kbits). The twelve bit token bucket depth is expressed in units of 256 bytes, so bucket depths range from 256 bytes to 212 times that or 1 Mbyte. The token bucket rate is expressed in units of 16 bytes per millisecond. Each bucket may control up to the aggregate incoming data rate on all ports associated with an interface module.

Figure 5:
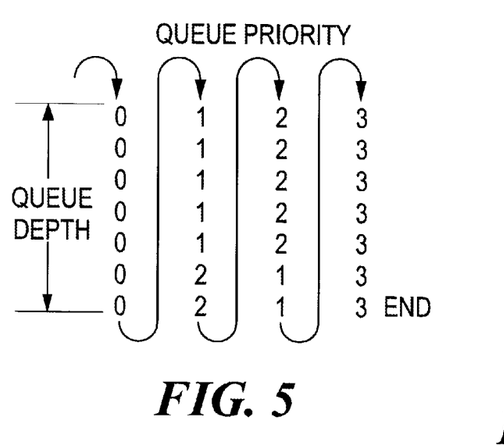
FIGS. 5–7 illustrates queue prioritization.

FIG. 5 illustrates queue prioritization on a per port basis. Four queues, designated 0, 1, 2 and 3 are associated with each port, and each frame is associated with at least one such queue for transmission. The Master Buffer ASIC is configured with a queue drainage schedule that governs the relative rate at which each of the four queues is drained to the Transmit Header Processor. Frames are sequentially loaded in the queues and selected for transmission based upon the illustrated prioritization ordering scheme. Frames associated with queue 0 are always given the highest priority and frames associated with queue 3 are always given lowest priority. Queue 1 is a lower priority than queue 0, and higher priority than queues 2 or 3. However, queues 1 and 2 implement cross over sharing at a predetermined depth (six frames deep is shown) into each such queue. In the illustrated example when five frames associated with queue 1 are transmitted, two frames associated with queue 2 are then transmitted, assuming such queues are loaded with frames.

Traffic associated with queue 0 is preferably of a protocol Type that will not utilize all available bandwidth and starve queues 1, 2 and 3. For example, RSVP Type traffic can be limited by other mechanisms within the bridge/router and hence may be assigned to queue one. Further, administrative overhead data transmitted in frames between devices in the network may be assigned to queue 0 in order to facilitate smooth network operation.

Figure 6:
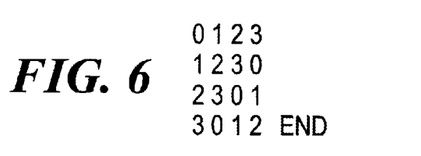
Figure 7:
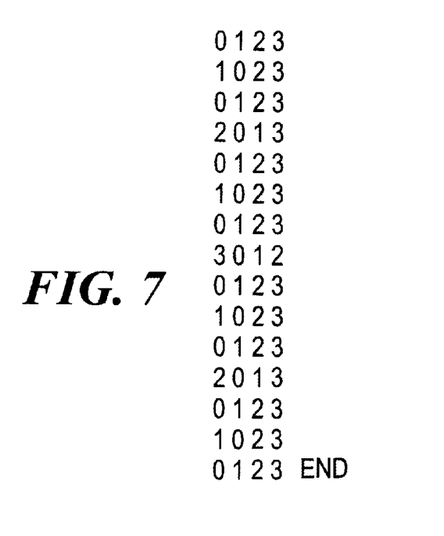

In the alternative embodiment illustrated in FIG. 6 equal weighting is given to each queue. As a result, each queue is presented with drainage equal opportunities. FIG. 7 illustrates a drainage schedule with relative weighting of 8-4-2-1. Multiple drainage schedules may be employed, and each port can be drained according to any of the drainage schedules.

In order to further facilitate smooth operation the bridge/router implements a Random Early Drop ("RED") procedure. The Frame Processor 30 configures a congested ports bitmask to indicate to the Receive Frame Processor 48 which output ports are deemed to be nearly full of queued frames. The Frame Processor determines which output ports are congested based upon Master Buffer ASIC 32 statistics and Master Buffer ASIC queue lengths. For each output port which is congested, the Frame Processor configures a "RED shift value." The RED shift value is a length, in bits, of a bitmask that is ANDed with a random number generated by the Receive Frame Processor. The resulting number, N, is the number of frames to be queued, and the Nth frame is intentionally dropped. When the Nth frame is dropped, a new random number is generated and the countdown to the next dropped frame begins. The drop rate resulting from the RED procedure is a function of the RED shift value and the generated random numbers. In particular, Drop Rate=

TotalDrops/TotalPackets=2/(N+1).

The Frame Processor dynamically adjusts the RED shift value for congested output ports based on feedback from the Master Buffer ASIC. Hence, small numbers of packets are dropped before output queues are overflowing, and a percentage of the end-stations generating the congesting traffic should respond with lower transmission rates.

Having described the preferred embodiments, other embodiments that incorporate concepts of the presently disclosed invention will become apparent to those of skill in the art. Therefore, the invention should not be viewed as limited to the disclosed embodiments but rather should be viewed as limited only by the spirit and scope of the appended claims.

What is claimed is:

1. A method for assigning at least one Quality of Service variable to an Ethernet frame in a telecommunications device, comprising the steps of:

receiving said Ethernet frame at a network interface module of said device configured for Ethernet type traffic, said received Ethernet frame having a header;

determining if said received Ethernet frame includes both positively identified source and destination addresses, wherein said determining if said received Ethernet frame includes both positively identified source and destination addresses includes comparing a unique identifier with a first portion of a destination address selected from the header, wherein said unique identifier is associated with the bridge/router, and comparing a second portion of the destination address with a predetermined range of values in the event that the unique identifier matches the first portion of the destination address;

determining, in the event that the second portion of the destination address is within the predetermined range of values, whether a protocol type of said received Ethernet frame is an IP protocol type, wherein said determining whether said protocol type of said Ethernet frame is an IP protocol type includes comparing the protocol type with at least one predetermined value;

associating said received Ethernet frame with a flow in the event said received Ethernet frame includes both positively identified source and destination addresses; and in the event said protocol type of said received Ethernet frame is an IP protocol type and said received Ethernet frame is associated with a flow, indexing into a memory within said device using selected portions of said header to obtain, via a single lookup, both said at least one quality of service variable and routing information associated with said received Ethernet frame.

2. The method of claim 1 further including the step of determining a data unit protocol type from the protocol type field of the selected portions of the data unit header, and determining a class of service and employing the data unit protocol type and class of service to obtain a transmission priority designator if the data unit is determined not to be associated with a flow.

3. Apparatus for determining a Quality of Service variable to be employed by a telecommunications device when processing a received Ethernet frame, comprising:

a network interface module configured for Ethernet type traffic, said network interface module operative to receive said Ethernet frame, and wherein said Ethernet frame includes a header;

a memory in which at least one Quality of Service variable is stored together with routing information;

a filter operative to determine whether said received Ethernet frame is associated with a flow by ascertaining whether a protocol type of said received Ethernet frame is an IP protocol type and whether said header portion of the received Ethernet frame indicates a source address and a destination address that are both positively identified, wherein said filter is operative to ascertain whether said protocol type of said received Ethernet frame is an IP protocol type by comparing the protocol type field of the received Ethernet frame with at least one predetermined value to determine said protocol type of said received Ethernet frame, and wherein said filter is operative to ascertain whether said source address and said destination address are positively identified by comparing a unique identifier associated with the bridge/router with a first portion of the destination address, and comparing a second portion of the destination address with a predetermined range of values if the unique identifier matches the first portion of the destination address; and processor circuitry operative to select a flow identifier including at least a portion of said header to obtain, via a single lookup, both said at least one Quality of Service variable and routing information associated with said received Ethernet frame.

4. The apparatus of claim 3 wherein the processor circuitry is operative to determine a data unit protocol type and class of service and to employ the data unit protocol type and class of service to obtain a transmission priority designator if the data unit is determined not to be associated with a flow.

5. The method of claim 1, wherein said at least one Quality of Service variable includes a token bucket depth indicator.

6. The method of claim 1, wherein said at least one Quality of Service variable includes a transmit queue designator.

7. The method of claim 1, wherein said at least one Quality of Service variable includes a loss flag.

8. The method of claim 1, wherein said at least one Quality of Service variable includes an excess transmit queue designator.

9. The method of claim 1, wherein said at least one Quality of Service variable includes an excess loss flag.

10. The method of claim 1, wherein said at least one Quality of Service variable includes a designator for excess action to be taken on non-conforming frames.

11. The method of claim 1, wherein said at least one Quality of Service variable includes a retag enable indicator.

12. The method of claim 1, wherein said at least one Quality of Service variable includes a retag class designator.

13. The method of claim 1, wherein said at least one Quality of Service variable includes a Quality of Service enable bit indicating whether the at least one Quality of Service variable is valid.

14. The apparatus of claim 3, wherein said at least one Quality of Service variable includes a token bucket depth indicator.

15. The method of claim 3, wherein said at least one Quality of Service variable includes a transmit queue designator.

16. The apparatus of claim 3, wherein said at least one Quality of Service variable includes a loss flag.

17. The apparatus of claim 3, wherein said at least one Quality of Service variable includes an excess transmit queue designator.

18. The apparatus of claim 3, wherein said at least one Quality of Service variable includes an excess loss flag.

19. The apparatus of claim 3, wherein said at least one Quality of Service variable includes a designator for excess action to be taken on non-conforming frames.

20. The apparatus of claim 3, wherein said at least one Quality of Service variable includes a retag enable indicator.

21. The apparatus of claim 3, wherein said at least one Quality of Service variable includes a retag class designator.

22. The apparatus of claim 3, wherein said at least one Quality of Service variable includes a Quality of Service enable bit indicating whether the at least one Quality of Service variable is valid.

23. A method for assigning at least one Quality of Service variable to an Ethernet frame in a telecommunications device associated with a cache memory in which at least one Quality of Service variable is maintained, the cache memory further maintaining routing information, comprising the steps of:

receiving said Ethernet frame at a network interface module of said device configured for Ethernet type traffic, said received Ethernet frame having a header;

determining whether the received Ethernet frame is associated with a flow by determining whether a protocol type of said received Ethernet frame is an IP protocol type and whether a header portion of the data unit indicates both a positively identified source address and a positively identified destination address, wherein said determining if said received Ethernet frame includes both a positively identified source address and a positively identified destination addresses includes comparing a unique identifier with a first portion of a destination address selected from the header, wherein said unique identifier is associated with the bridge/router, and comparing a second portion of the destination address with a predetermined range of values in the event that the unique identifier matches the first portion of the destination address, and wherein said determining whether said protocol type of said Ethernet frame is an IP protocol type includes comparing the protocol type with at least one predetermined value; and in the event said received Ethernet frame is determined to be associated with a flow, indexing into said cache memory to obtain, via a single lookup, the at least one Quality of Service variable and routing information for the received Ethernet frame.

24. Apparatus for determining a Quality of Service variable to be employed by a telecommunications device when processing a received Ethernet frame, comprising:

a network interface module configured for Ethernet type traffic, said network interface module operative to received said Ethernet frame, and wherein said received Ethernet frame includes a header;

a cache memory in which at least one Quality of Service variable is stored, the cache memory further storing routing information;

a filter operative to determine whether the data unit is associated with a flow by ascertaining whether a protocol type of said received Ethernet frame is an IP protocol type and whether a header portion of the data unit indicates both a positively identified source address and a positively identified destination address, wherein said filter is operative to ascertain whether said protocol type of said received Ethernet frame is an IP protocol type by comparing the protocol type field of the received Ethernet frame with at least one predetermined value to determine said protocol type of said received Ethernet frame, and wherein said filter is operative to ascertain whether said source address and said destination address are positively identified by comparing a unique identifier associated with the bridge/router with a first portion of the destination address, and comparing a second portion of the destination address with a predetermined range of values if the unique identifier matches the first portion of the destination address; and processor circuitry operative to perform a single look-up operation on said cache memory based on selected portions of said header to obtain both said at least one Quality of Service variable and routing information from the cache memory for application to the received Ethernet frame in the event that said received Ethernet frame is determined to be associated with a flow.

* * * * *

UNITED STATES PATENT AND TRADEMARK OFFICE
CERTIFICATE OF CORRECTION

PATENT NO. : 6,205,149 B1
DATED : March 20, 2001
INVENTOR(S) : Thomas A. Lemaire et al.

Page 1 of 1

It is certified that error appears in the above-identified patent and that said Letters Patent is hereby corrected as shown below:

Column 4,
Line 2, "20 a" should read -- a --;
Line 64, "an" should read -- as --; and Column 6,
Line 44, "212" should read -- $2^{12}$ --.

Signed and Sealed this

Seventh Day of May, 2002

Attest:

JAMES E. ROGAN
Attesting Officer    Director of the United States Patent and Trademark Office